(No Model.)

J. BALMORE & E. E. GOLD.
HOSE COUPLING.

No. 462,464. Patented Nov. 3, 1891.

WITNESSES:
John Becker
Fred White

INVENTORS:
John Balmore and
Edward E. Gold,
By their Attorneys,
Arthur C. Fraser & Co.

UNITED STATES PATENT OFFICE.

JOHN BALMORE AND EDWARD E. GOLD, OF NEW YORK, N. Y.; SAID BALMORE ASSIGNOR TO SAID GOLD.

HOSE-COUPLING.

SPECIFICATION forming part of Letters Patent No. 462,464, dated November 3, 1891.

Application filed July 6, 1891. Serial No. 398,526. (No model.)

*To all whom it may concern:*

Be it known that we, JOHN BALMORE and EDWARD E. GOLD, both citizens of the United States, residing in the city, county, and State of New York, have invented certain new and useful Improvements in Hose-Couplings, of which the following is a specification.

This invention relates to couplings for hose or flexible pipes, being especially designed and adapted for coupling together the terminal sections of hose of the steam-heating or air-brake pipes of railway-cars, although applicable also for other purposes.

Our improved coupling relates to that class of couplers wherein the seating-faces of the coupling-heads meet in a plane perpendicular to the general direction of the hose or pipe, being known as "direct-port" couplers. The heads of such couplers as usually made consist of cubical or angular blocks having each a locking projection on one side and a locking-arm projecting forward from the other side and having a locking-face adapted to engage with a similar projection on the side of an opposite or reciprocal head, the locking-faces being made eccentric, so that as the heads are united by a rocking movement the locking-faces wedge tightly together.

The object of the present invention is to provide means for guiding the heads into proper relative positions during the coupling operation and for maintaining the seats in correct coincidence.

Figure 1:
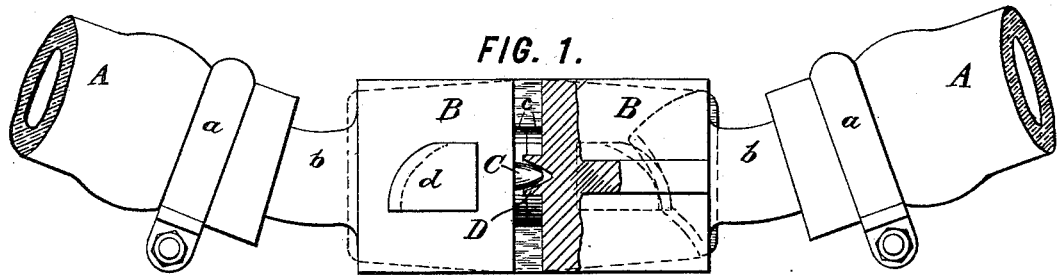
Figure 2:
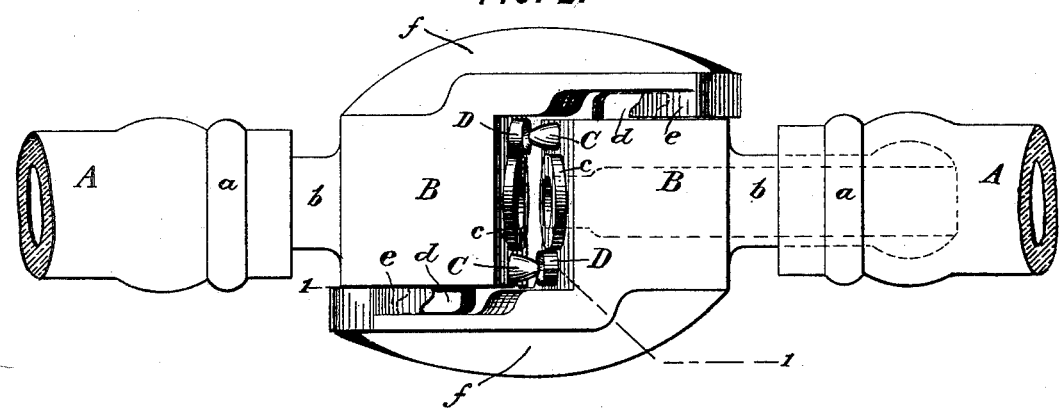
Figure 3:
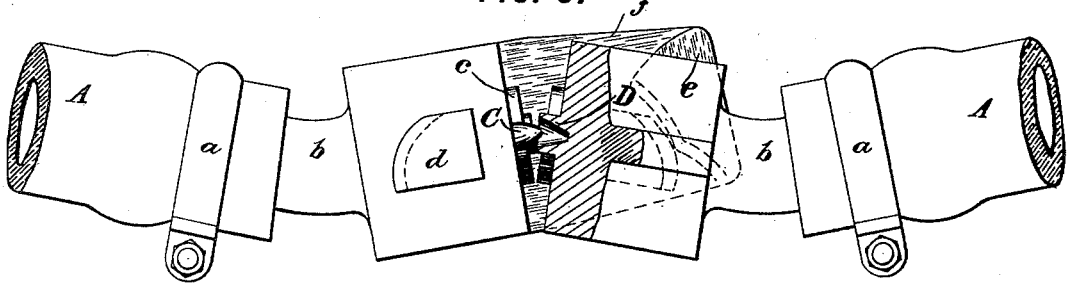
Figure 4:
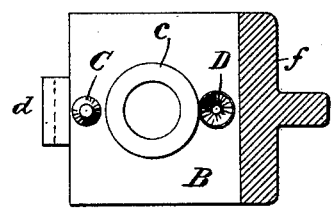

Figure 1 of the accompanying drawings is a side elevation of a pair of our improved coupling-heads in the coupled position, the right-hand head being partly broken away on the line 1 1 in Fig. 2. Fig. 2 is a plan or oblique section showing the two heads in the act of coupling together. Fig. 3 is a side elevation of the heads in the same position as in Fig. 1, the right-hand head being partly in section in the same plane as Fig. 1. Fig. 4 is an end view of one of the heads, its projecting locking-arm being in transverse section.

Let A A designate the lengths of hose to be coupled together, and B B the respective coupling-heads, which are united to the lengths of hose by any suitable or known means—for example, by a tubular shank $b$, having an enlargement over which the hose is drawn and fastened by a divided ring $a$, as shown. Each head has a seat $c$ on its front side, the opening therein communicating by a passage through the head with the hollow shank $b$. The seat is a ring of suitable material mounted unyieldingly in the head and projecting beyond the end face thereof. Each head has a locking projection $d$ on one side and a locking-arm $f$ on the other, this arm projecting forward and carrying an inward projection $e$, which is adapted to engage the projection $d$ on the opposite head in the manner well known in the art. The engaging-faces of the projections $d$ and $e$ are made eccentric or wedge-shaped, so that in coupling the two heads together their seats are forced toward one another into tight contact. When coupled, they are maintained in this position by gravity, since the weight of the coupling, which is somewhat heavy, hangs from the hose-lengths A A, which are attached at their other ends to the fixed pipes of the two adjoining cars. The shanks $b$ $b$ are so bent that the weight of the coupling is made effective to hold the heads in engagement, and so that as the cars are pulled apart the coupling will automatically uncouple. So far as described, our improved coupling does not differ materially from a well-known construction known in the art as the "Sewall coupler."

In order to insure that the two coupling-heads be brought together in proper relative positions, so that the wedging-faces of the locking projections shall properly engage with one another, it is very desirable that some means be provided for properly guiding the heads relatively to one another. The means provided according to our invention consists of male and female guides arranged on opposite sides of the seats $c$ on the right and left thereof, and so that the male or projecting guide on the one head will enter the female or receding guide on the other. In order that both heads shall be made alike and interchangeable, each head is formed with a male guide on one side of its seat and a female guide on the other, so that when a like head is reversed and brought face to face with it, the male guides on the two heads will enter each the female guide on the opposite head. The shape of the guides is not essential, provided that they be so conformed as to properly engage with one another sufficiently before the heads are brought fully together to insure the proper engagement of the locking-faces. We prefer rounded or approximately conical or conoidal guides; but other shapes may be used. These guides are clearly shown in the drawings, wherein C C are the male and D D the female guides. These may be constructed integrally with the heads, as shown, or they may be separate pieces fastened in any suitable manner to the body of the respective heads. Their arrangement is preferably that shown—namely, the male guide on each head at one side of the seat and the female guide on the other side thereof. They may, however, be arranged in other relative positions, provided only that they shall be adapted to properly come together and guide the locking-faces of the respective heads into correct engagement. If either head approaches the other in a position too high relatively to the other head, the guides will come together eccentrically, and thus by touching on one side first will press the higher head downward as it engages with the other, bringing it thus to proper central position before the locking-faces bring the seats tightly into engagement, so that the final locking movement is effected after the seats are in coincidence, and serves solely to tighten them together.

It will be observed that not only do the seats c c project beyond the front faces of the coupling-heads, but the guides C and D also project, and to a greater distance than the seats, but to not more than twice the projection of the seats, so that neither of the guides projects farther than the plane of the end face of the opposite head when coupled. The female guides D consist each of a projecting boss of suitable shape, with a conical, conoidal, or other suitably-shaped depression therein adapted to receive the male guide C on the opposite head. By reason of the seats being unyieldingly mounted in the heads they maintain their projection as the heads are coupled, and the wedging action of the locking-faces which draw the heads together causes the seats to be pressed into tight contact without impairing the connection of the guides, which in the locked position are in the condition of most intimate engagement, so that they serve not only to guide the seats into coincidence in the act of coupling, but also to hold them against relative displacement while coupled.

Our improved coupling-head has the advantage of intercoupling readily with the Sewall coupler, since the guides C and D project a distance less than twice the projection of the seat, and consequently do not come into contact with the end of the head of the Sewall coupling. More care, however, is required in coupling our improved head with the Sewall coupler than with a duplicate head, since there are no reciprocal engaging-guides to bring the locking-faces of the heads into proper relative position, and the operator is forced to rely upon the accuracy with which he brings the heads together.

We claim as our invention the following-defined novel features, substantially as hereinbefore specified, namely:

1. In a hose-coupling, reciprocal coupling-heads having locking projections for coupling them together, and projecting seats at their abutting ends, and reciprocally-interengaging male and female guides C and D, projecting from the end faces of the heads on opposite sides of the seats to an extent not exceeding twice the projection of the seats, whereby the guides engage during the act of coupling and direct the seats and locking projections into proper relative positions, while the projecting guides do not interfere with either head being coupled with a similar head devoid of such guides.

2. The combination of two reciprocal coupling-heads, each constructed with an unyieldingly-mounted projecting seat $c$ at its end, and with locking projections $d$ and $e$, having wedging locking-faces adapted, on engaging the corresponding faces on the other head, to force the two heads together and press their seating-faces into close contact, and with male and female guides C and D, both projecting from its end face beyond the seating-face and to an extent not exceeding twice the projection of the seat, whereby, in the act of coupling, the guides on the two heads reciprocally engage and direct the seats into coincidence, and by the wedging together of the heads the guides are brought into most intimate engagement when fully coupled and serve to prevent any relative displacement of the heads and seats.

In witness whereof we have hereunto signed our names in the presence of two subscribing witnesses.

JOHN BALMORE.
    EDWARD E. GOLD.

Witnesses:
 GEORGE H. FRASER,
 CHARLES K. FRASER.